July 30, 1940.  E. C. HORTON  2,209,921
WINDSHIELD CLEANER MOTOR
Filed June 12, 1937  3 Sheets-Sheet 1
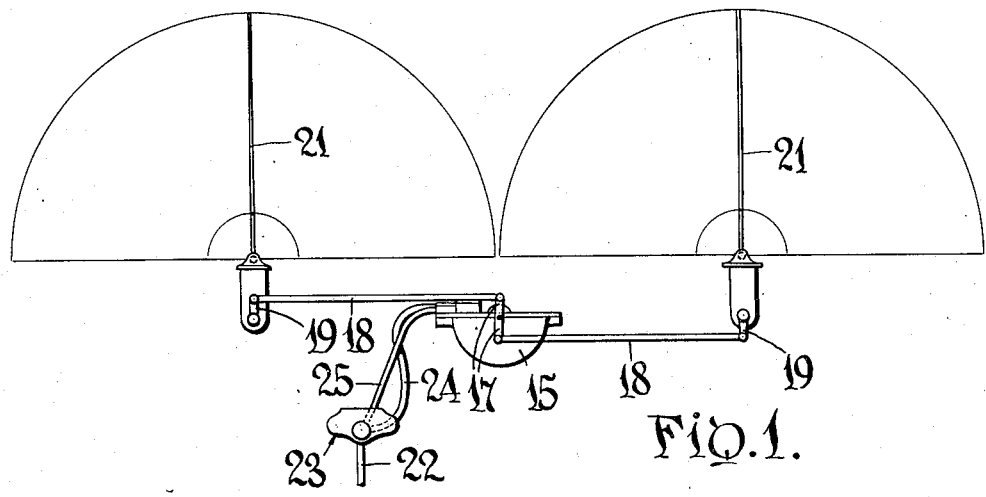
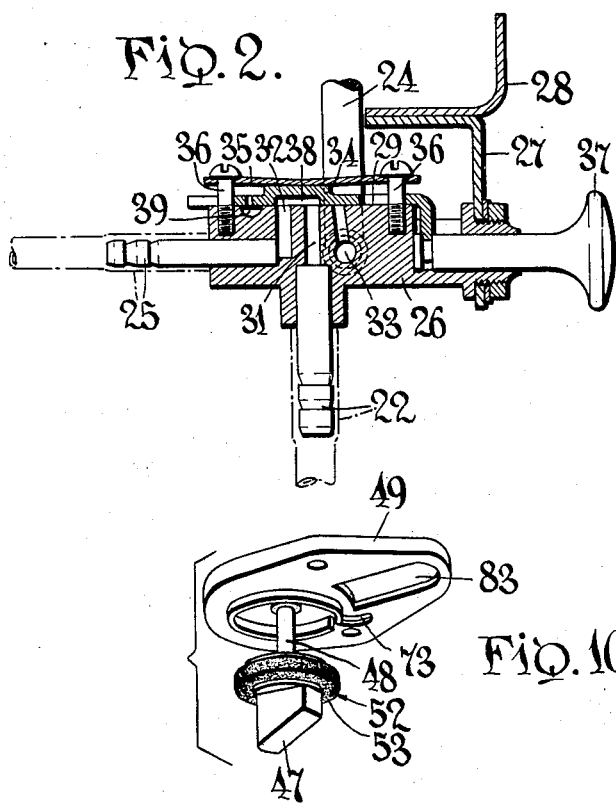
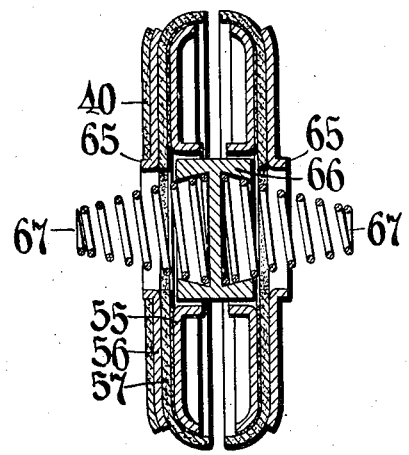
INVENTOR
Erwin C. Horton,
BY
Beau, Brooks, Buckley & Beau.
ATTORNEYS July 30, 1940.  E. C. HORTON  2,209,921
WINDSHIELD CLEANER MOTOR
Filed June 12, 1937  3 Sheets-Sheet 2
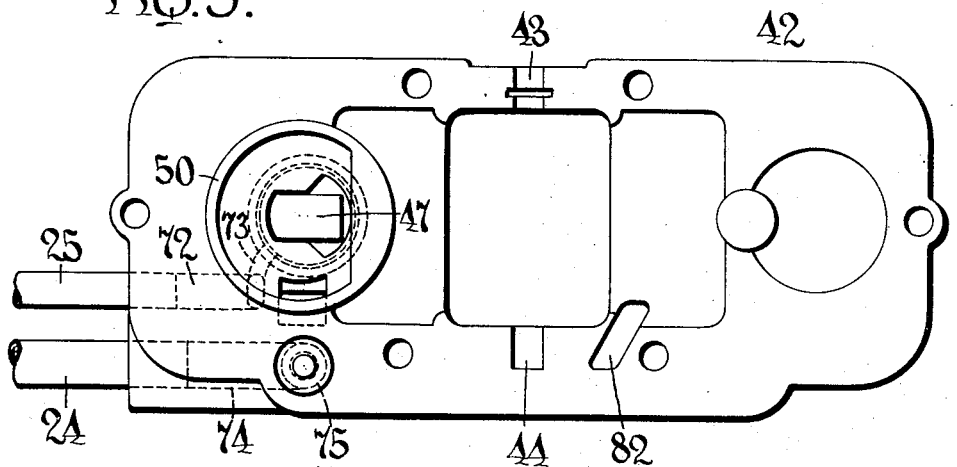
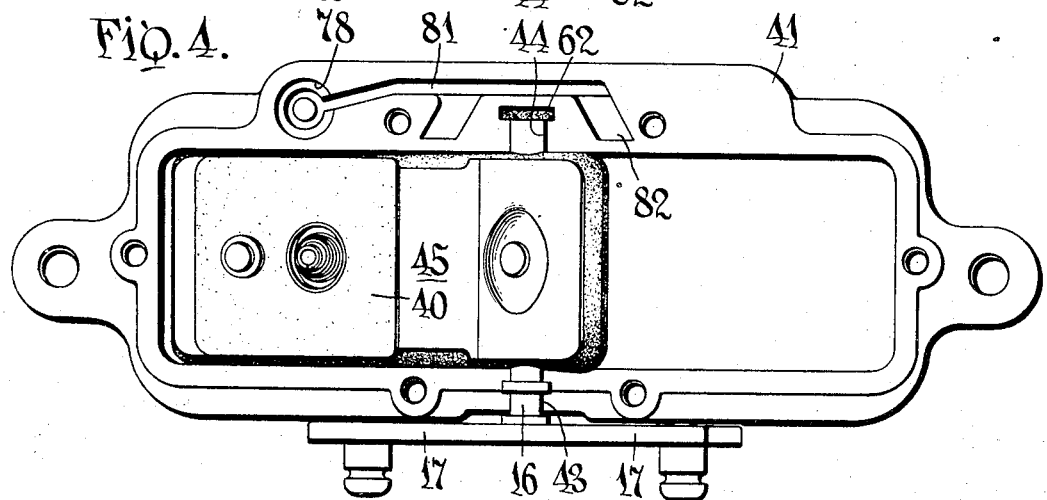
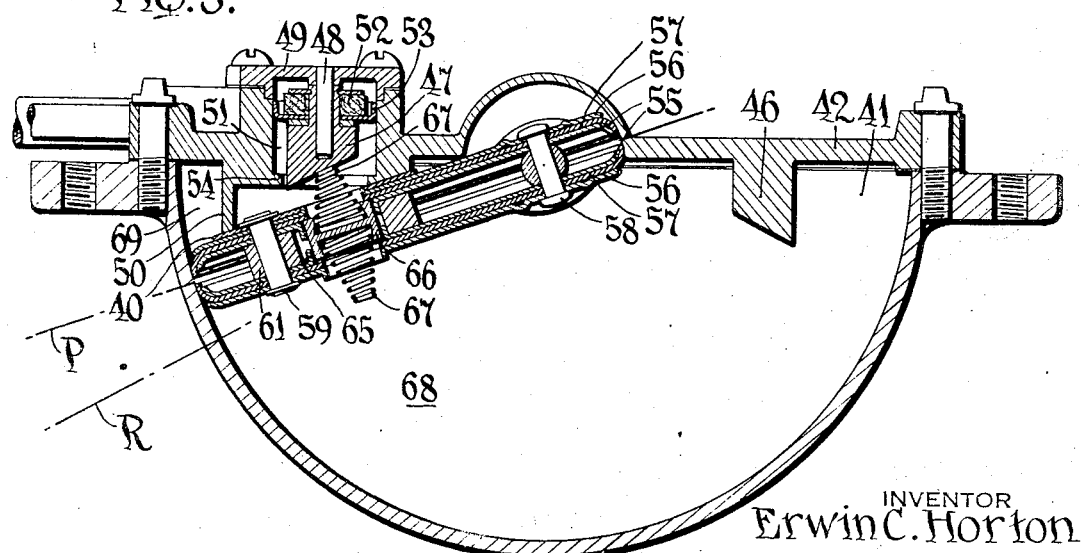
INVENTOR
Erwin C. Horton,
BY
Beau, Brooks, Buckley & Beau.
ATTORNEYS July 30, 1940.  E. C. HORTON  2,209,921
WINDSHIELD CLEANER MOTOR
Filed June 12, 1937   3 Sheets-Sheet 3

INVENTOR
Erwin C. Horton,
BY
Beau, Brooks, Buckley & Beau.
ATTORNEYS

Patented July 30, 1940

2,209,921

UNITED STATES PATENT OFFICE 2,209,921

WINDSHIELD CLEANER MOTOR

Erwin C. Horton, Hamburg, N. Y., assignor to Trico Products Corporation, Buffalo, N. Y.

Application June 12, 1937, Serial No. 147,886

8 Claims. (Cl. 121—97)

The present invention relates to fluid pressure operated devices and has particular reference to an improved motor which is especially adapted for operating the windshield cleaner of a motor vehicle.

The motor, which may be of the vane piston type, has fluid inlet valve means operable by and upon approach of the piston to the end of its normal operating stroke, and exhaust fluid valve means operable by fluid pressure in accordance with the change in fluid pressure conditions resulting from operation of the fluid inlet valve means.

The invention also contemplates a fluid pressure operable parking arrangement for the motor, whereby the fluid inlet valve will fail to respond to the piston reaching one limit position and the movement of the piston will therefore not be reversed, but will remain stationary or parked.

These and other objects and advantages will become apparent from the follow description of the typical embodiment of the invention shown in the accompanying drawings, wherein:

Fig. 1 is a diagrammatic view showing the assembly upon a motor car of a windshield cleaner apparatus, including motor, motor control, wipers, and links connecting motor and wipers;

Fig. 2 is a vertical sectional view through the motor control unit shown in Fig. 1;

Fig. 3 is a vertical sectional view through the motor (in parked position) in a plane normal to the axis of the motor shaft;

Fig. 4 is a top plan view of the motor with the upper portion thereof removed;

Fig. 5 is a bottom plan view of the upper portion of the motor;

Fig. 9 is a fragmentary sectional view at right angles to Fig. 3 and illustrating the valve mechanism in the vane piston; and, Fig. 10 is a perspective view of parts disconnected from the upper portion of the motor unit.

Figure 6:
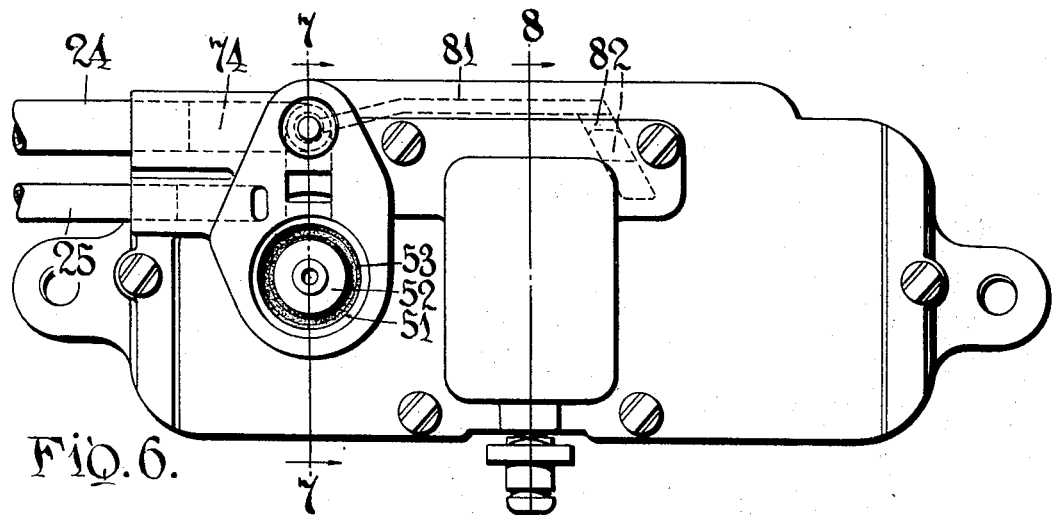
Fig. 6 is a top plan view of the motor with the upper portion thereof in place.

As indicated by Fig. 1, the windshield cleaner apparatus may comprise a motor unit 15 having an angularly oscillating rock shaft 16 carrying opposed crank arms 17, 17, which are pivoted to links 18, 18 that are in turn pivoted to cranks 19, 19. Each of the latter is operatively connected to a wiper assembly 21 which moves back and forth in an arcuate path across the windshield glass of the vehicle as the motor rock shaft oscillates angularly about its axis.

A suction line 22 extending from the intake manifold of the vehicle engine, or from another source of suction, connects with a control unit 23. From this unit extends tubes 24 and 25 to the motor unit. The control unit serves to place one or the other of tubes 24 and 25 into communication with suction line 22, for causing the motor to operate or assume a parked position, respectively.

The motor unit 15 may be mounted in any position from which linkage may be extended to the windshield wipers, and the control unit 23 in any position accessible to the operator. For example, as shown in Fig. 2, the casing 26 of the unit may have a bracket 27 secured to the lower flange 28 of the instrument panel of the vehicle. The casing has a flat valve seat 29 into which opens a port 31 in communication, through a suitable nipple, with tube 22; a port 32 in communication with tube 25; and a port 33 communicating with the suction line 24. A valve 34 is pressed against the seat 29 by a spring 35 that is anchored to the casing 26 by fasteners 36, 36, the valve being movable longitudinally by the handle 37 which is connected thereto and is slidable in the casing. The valve has a recess 38 which, in the position shown in Fig. 2, opens communication between ports 31 and 32; between the suction line 22 and tube 25, causing the wiper motor to assume a parked position. When the valve position is changed by the handle 37 being moved to the right (as the device appears in Fig. 2), ports 31 and 33 are caused to communicate through recess 38 so that tube 24 is connected to suction line 22 and the motor caused to operate, whereas port 32 and tube 25 are vented to the atmosphere through vent 39 in the valve.

As shown in Figs. 3, 4 and 5 the motor casing has a lower or body portion 41 and an upper or cover portion 42, the sides of which form bearings 43 and 44 for the rock shaft 16. To this shaft is affixed a vane type piston 45 that oscillates angularly in the casing about the shaft axis, the limits of the movement being determined by stop member 46 formed on cover portion 42 and stop member 47 mounted slidably on a rod 48 carried by a removable section 49 of the cover portion 42 of the casing, the rod 48 being axial of a cylinder 51 formed in the cover 42. Carried by movable stop 47 and reciprocable in the cylinder is a piston 52 which includes a cupped packing member 53 having its peripheral flange directed upwardly.

Normally the piston is in its lower limit position, bearing against the inwardly directed flange 54 around the bottom of cylinder 51 (in the position shown in Fig. 7) but in parking the cleaner the piston and stop 47 are in the retracted position shown in Fig. 3, so that a gasket 40 secured to one side of the vane may contact and bear against a continuous ridge or frame 50 extended from cover section 42 into the motor chamber.

The vane or piston 45 is made up of inner plates 55, 55 and outer plates 56, 56, with a cupped packing member 57 between each inner and outer plate, the flanges of the packing members being directed toward each other. The assembly is held together by riveted fasteners 58 and 59, the first extending through the rod shaft 16 and holding the vane thereto, and the second 59 extending through a block 61 which is between the inner plate members 55, 55.

Each inner plate 55 has an aperture with an inturned peripheral flange 65, the two flanges 65, 65 being aligned and forming a loose fitting guide for a valve 66, opposite faces of which are recessed for receiving and holding tapered coiled springs 67, 67. Packing members 57, 57 and outer plates 56, 56 of the vane have apertures to pass the springs, but the portions of packing members 57, 57 adjacent the apertures form seats for the valve faces. That is, for example, when the valve 66 is in the position shown in Fig. 3 it is seating against the upper, or left hand, packing 57, and is spaced from the other packing so that air may pass from the interior of the vane between flange 65 and the valve and between the lower or right hand packing 57 and the valve into the portion of the motor cleaner 68, while no air may pass from the vane interior to the opposite portion of the motor chamber 69.

The interior of the vane is vented to the atmosphere via a pocket 62 formed in the side wall of the casing section 41, a communicating opening 63 in the rock shaft 16, and ports 64, 64, also in the rock shaft, opening into the interior of the vane. Pocket 62 is open at its bottom to admit air and may be filled with felt or other material for filtering foreign matter and silencing the intaken air. Opening 63 in the rock shaft is formed by an axial bore partially filled by an axially extending pin 71. This pin has been found to have a muffling action which appreciably reduces the noise of air passing through bore 63 and ports 64, 64.

Figure 7:
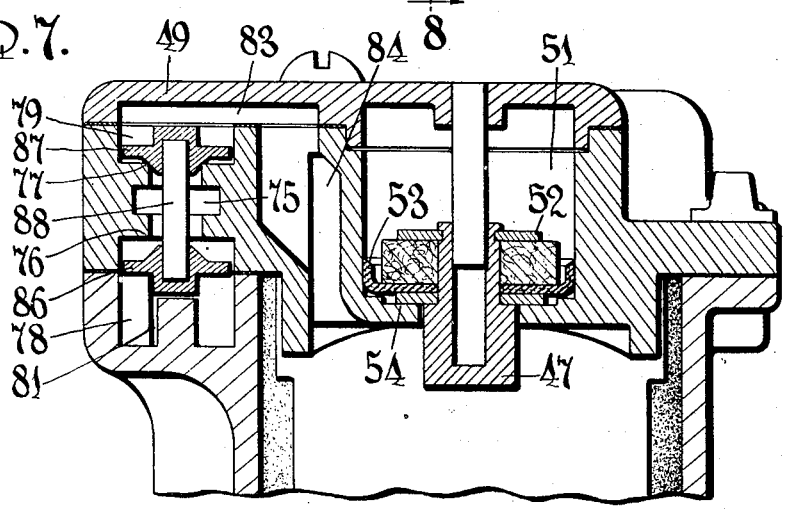
Fig. 7 is a vertical sectional view taken approximately upon line 7—7 of Fig. 6 with the motor parts in an operating position.
Figure 8:
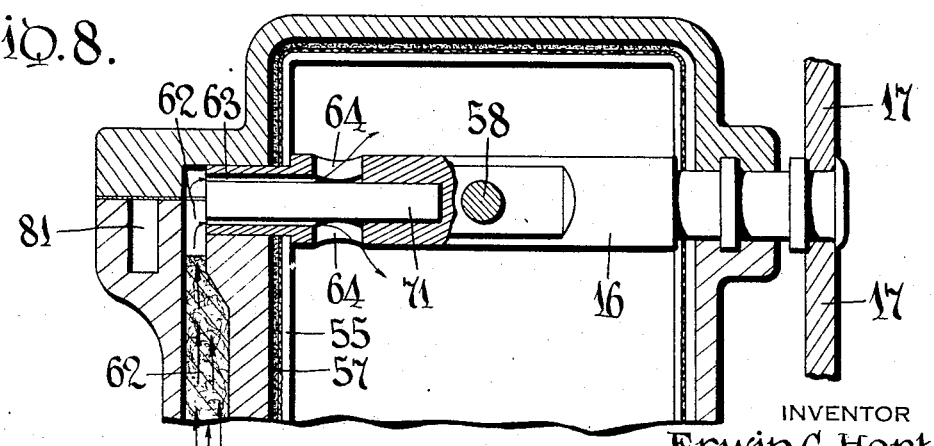
Fig. 8 is a fragmentary sectional view taken approximately upon line 8—8 of Fig. 6.

Tube 25 from the control unit 23 communicates through a passage 72 in cover section 42 of the motor casing, and a continuation passage 73 in casing part 49, with the upper portion of cylinder 51. Tube 24, also extending from the control unit 23, communicates through passage 74 (see Fig. 5) with a chamber 75 (see Figs. 5 and 7) in cover section 42. This chamber opens through valve seats 76 and 77, respectively, into valve cylinders 78 and 79. Valve cylinder 78 communicates, through a passage 81 in casing section 41, and through an extension 82 of the passage in casing section 42, with motor chamber 68 (the chamber to the right of the vane in Figs. 3, 4 and 5). The other valve cylinder, 79, communicates with the opposed motor chamber, 69, through passage 83 in casing section 49 and the adjoining passage 84 in casing section 42, as is shown in Fig. 7.

For closing respectively against valve seats 76 and 77 are valves 86 and 87 joined by a valve stem 88 of such length that one of the two valves is unseated when the other is seated. The heads of the valves are of only slightly less diameter than the bores of the valve cylinders so that the valves act similarly to pistons in responding to differential fluid pressure on opposite faces thereof.

In the condition of operation illustrated in Figs. 2 and 3 the control handle 37 is "pushed in" so that tube 25 is connected by the suction line 22 to a source of suction, and tube 24 is disconnected therefrom, as set forth hereinbefore in the description of operation of control unit 23. The upper portion of cylinder 51 is therefore partially evacuated and air has likewise been withdrawn from the lower portion of the cylinder and from the space between the walls of frame 50 since the flanges of packing 53 of piston 52 are upwardly directed and will pass fluid in that direction. Air under atmospheric pressure is present in motor chamber 68, having entered via pocket 62, shaft passage 63, shaft ports 64 into the vane, and past valve 66. Accordingly the vane 45, and the gasket 40 carried thereby, are held pressed against the frame 50. It will also be noted that the piston 52 and movable stop 47 are in their upward limit positions, being allowed to move there initially by withdrawal of air from the upper side of cylinder 51 and retained there by friction and the adjacent spring 67.

During this parked position of the motor parts (wherein the center line of the vane is approximately indicated by line P in Fig. 3) the crank arms 17, 17 will be in their limit position of clockwise movement (clockwise as the device appears in Fig. 1) and the wiper assemblies 21, 21 preferably will be held in an inconspicuous position adjacent the edge of the windshield glass.

In order to operate the windshield cleaner, the handle 37 of the control unit is pulled out, so that, as previously described, tube 25 is vented to the atmosphere and tube 24 connected by suction line 22 to a source of suction. Consequently suction is applied to the area of the vane bounded by frame 50 and the underside of piston 52, via tube 24, passage 74, chamber 75, valve seat 77 (valve 87 being opened), and passages 83 and 84; simultaneously air under atmospheric pressure continues to engage the opposite side of the vane 45 and now also engages the upper side of piston 52, entering the upper side of cylinder 51 via tube 25 and passes 72 and 73. The result is downward movement of piston 52 and stop 47 to the position shown in Fig. 7, and compression of the engaged spring 67 to the point where it will move valve 66 downwardly, cutting off the passage of air from the vane interior into chamber 68 and allowing the air to enter the space between the walls of frame 50.

A rush of air under atmospheric pressure from this zone through passages 84 and 83 into valve chamber 79 will cause valve 87 to seat, thereby opening valve 86. Suction will thereupon exhaust air from motor chamber 68, via port 82, passage 81 valve chamber 78, and chamber 75 to tube 24, and the result will be movement of the vane toward stop 46.

When the right hand spring 67 (as viewed in Fig. 3) reaches stop 46, continued movement of the vane will compress the spring until it will shift valve 66, now cutting off entrance of air from the vane interior into chamber 69, and directing such air into chamber 68. The rush of air through port 82 and through passage 81 into valve chamber 78 will close valve 86, thereby opening valve 87. The ensuing reversal of atmospheric pressure and suction to the faces of the vane will cause reversed movement of the latter, toward movable stop 47. When spring 67 engages the stop 47, now in its lowered position, the center line of the vane will be approximately at the position indicated in Fig. 3 by line R, so that at approximately this point the spring will be compressed and valve 66 shifted, which will automatically result in shift of valves 86 and 87 and reversal of the vane's movement.

In this way the vane piston 45 will continue to oscillate, moving the wiper elements 21, 21 back and forth in an arcuate path over the face of the windshield glass. When it is desired to again park the wiper elements, inward movement of the control handle 37 will connect the source of suction to the upper side of cylinder 51, resulting in retraction of the movable stop 47 and the withdrawal of a large quantity of air from motor chamber 69, through cylinder 51 and past packing 53. And since the source of suction is simultaneously cut off from the motor chamber 68 (assuming the vane piston 45 to be moving toward stop 46) the valve 66 will shift to close the exhaust of air from the vane interior into motor chamber 69 and will cause such air to exhaust into motor chamber 68. The result will be movement of the vane to the parked position where it will be retained for reasons heretofore described.

What is claimed is:

1. In a motor operable by differential fluid pressures and including a chamber with piston means movable therein, valve means for alternately applying fluid under the higher pressure to one face and then the other face of the piston means, a passage for exhaust fluid having ports opening into the chamber on opposite sides of the piston means, a valve for each of said ports and a connection between said valves for causing one to open when the other closes, said valves being arranged in the path of flow of exhaust fluid and said flow being around the open one of said valves, and said valves being operable to open and close in accordance with the fluid pressure on opposite faces thereof.

2. In a windshield cleaner, a driving member movable to a limit position for parking and normally reversing before reaching said limit position, reversing means including a stop and a member movable into engagement with and operated by said stop to effect reversal of movement of the driving member when the latter reaches the normal reversing point, and fluid pressure operated means for retracting said stop member to permit the driving member to reach said limit position without reversing its movement.

3. In a windshield cleaner, a driving member movable to a limit position for parking and normally reversing before reaching said limit position, members engagable upon approach of the driving member to the normal reversing point for effecting reversal of movement of the driving member, and means for preventing engagement of said members to permit the driving member to reach said limit position without reversal.

4. In a motor operable by differential fluid pressures, a chamber and a piston movable therein, fluid operated means for directing exhaust of fluid from the chamber on one or the other side of the piston, and means for directing inlet fluid to the chamber on one or the other side of the piston, said last mentioned means including a port on each side of the piston and valve means within the piston closing one or the other of said ports, said valve means being shiftable by abutment with end portions of the chamber when the piston approaches the ends of its operating stroke, and means for conducting inlet fluid to said ports.

5. In a motor operable by differential fluid pressure, a chamber having spaced stops and a piston movable therein, means for permitting exhaust of fluid from the chamber on either side of the piston, and means for permitting inlet fluid to enter the chamber on the other side of the piston, said last mentioned means including a valve port on each side of the piston and valve means carried by the piston closing one or the other of said ports, said valve means being shiftable by abutment with said stops when the piston reaches the ends of its operating stroke, means for conducting inlet fluid to said ports, and means for at times retracting one of said stops to prevent shifting of said valve means when the piston approaches one end of its stroke.

6. In a motor operable by differential fluid pressures and including a chamber with a piston movable therein, said piston having a fluid inlet port opening into the chamber on each side of the piston, an inlet valve shiftable in the piston to open the inlet port on one or the other side of the piston and to close the opposite port, a spring on each side of the valve extending through the inlet port and engageable with an end wall portion of the chamber to shift the valve when the piston reaches a terminal position in the chamber, and outlet valve means movable to permit the exhaust of fluid from the chamber on one or the other side of said piston, said outlet valve means being responsive to and movable by the flow of fluid as directed by shifting of the inlet valve.

7. In a motor operable by differential fluid pressures, a pair of valve chambers and a passage therebetween for exhaust fluid, the chambers having openings into said passage, an exhaust valve in each valve chamber adapted to close the opening into said passage and means connecting the valves for causing one valve to be open when the other is closed, and each valve having associated therewith a part about which exhaust fluid passes when the valve is open, said part so closely fitting the adjacent chamber wall that in operation there may be a pressure differential on the opposite sides of said part of one valve to cause operation of the valves.

8. In a motor operable by differential fluid pressures, a motor chamber and piston means movable therein, inlet valve means controlled by the piston means for directing fluid into the motor chamber on one or the other side of said piston means, and outlet valve means responsive to fluid flow for directing the exhaust of fluid from the motor chamber on one or the other side of said piston means, said outlet valve means comprising opposed valve seats each having a cylinder wall in a fluid passage extending thereto, a valve for each seat and means connecting the valves for causing one valve to seat when the other is open, and each valve having associated therewith a part around which fluid flows when the valve is open, said part so closely fitting the adjacent cylinder wall that upon a change in fluid flow caused by operation of the inlet valve means there will be a pressure differential on opposite sides of said part of one valve to cause movement of the valves.

ERWIN C. HORTON.